(12) United States Patent
Srinivasan et al.

(10) Patent No.: US 11,523,429 B2
(45) Date of Patent: Dec. 6, 2022

(54) METHOD AND APPARATUS FOR MANAGING GRANT-FREE DATA TRANSMISSION IN RADIO COMMUNICATION NETWORK

(71) Applicants: Centre of Excellence in Wireless Technology, Chennai (IN); Indian Institute of Technology Madras (IIT Madras), Chennai (IN)

(72) Inventors: Nithin Srinivasan, Chennai (IN); Dhivagar Baskaran, Chennai (IN); Chandrasekaran Mohandoss, Chennai (IN); Sunil Kaimalettu, Chennai (IN); Jeniston Deviraj Klutto Milleth, Chennai (IN); Bhaskar Ramamurthi, Chennai (IN)

(73) Assignees: CENTRE OF EXCELLENCE IN WIRELESS TECHNOLOGY CEWIT, Chennai (IN); INDIAN INSTITUTE OF TECHNOLOGY MADRAS, Chennai (IN)

( * ) Notice: Subject to any disclaimer, the term of this patent is extended or adjusted under 35 U.S.C. 154(b) by 238 days.

(21) Appl. No.: 15/863,911

(22) Filed: Jan. 6, 2018

(65) Prior Publication Data
US 2018/0199371 A1 Jul. 12, 2018

(30) Foreign Application Priority Data
Jan. 7, 2017 (IN) .............................. 201741000732

(51) Int. Cl.
*H04W 74/04* (2009.01)
*H04W 72/12* (2009.01)
(Continued)

(52) U.S. Cl.
CPC ............... *H04W 74/04* (2013.01); *H04L 1/18* (2013.01); *H04L 1/1812* (2013.01); *H04W 4/20* (2013.01);
(Continued)

(58) Field of Classification Search
CPC ........... H04W 72/1268; H04W 52/146; H04W 72/14; H04L 1/1614
See application file for complete search history.

(56) References Cited

U.S. PATENT DOCUMENTS

2016/0119931 A1* 4/2016 Soriaga ............. H04W 72/0446
370/329
2018/0035458 A1* 2/2018 Islam .................... H04L 5/0096
(Continued)

FOREIGN PATENT DOCUMENTS

WO WO-2018122609 A2 * 7/2018 ........... H04L 1/1657

*Primary Examiner* — Ayaz R Sheikh
*Assistant Examiner* — Debebe A Asefa

(57) ABSTRACT

Embodiments herein provide a method and system for managing Grant-free data transmission in a radio communication network. The proposed method includes composing, by a Base Station (BS), a Select Signal (SS) for a transceiver device, where the SS is configured to control a grant-free data transmission from the transceiver device. Further, the proposed method includes transmitting, by the BS, the SS to the transceiver device. Further, the proposed method includes receiving, by a transceiver device, the SS from the BS. Further, the proposed method includes decoding, by the transceiver device, the SS and furthermore, the proposed method includes controlling, by the transceiver device, a data transmission by one of activating the grant-free data transmission from the transceiver device in response to successful decoding of the SS, and deactivating the grant-free data transmission from the transceiver device in response to unsuccessful decoding of the SS.

28 Claims, 9 Drawing Sheets

(51) Int. Cl.
*H04W 72/04* (2009.01)
*H04W 4/20* (2018.01)
*H04W 76/27* (2018.01)
*H04W 40/12* (2009.01)
*H04W 74/08* (2009.01)
*H04L 1/18* (2006.01)
*H04W 74/00* (2009.01)
*H04W 76/30* (2018.01)

(52) U.S. Cl.
CPC ......... *H04W 40/12* (2013.01); *H04W 72/042* (2013.01); *H04W 72/1289* (2013.01); *H04W 74/0841* (2013.01); *H04W 76/27* (2018.02); *H04W 72/0453* (2013.01); *H04W 74/006* (2013.01); *H04W 76/30* (2018.02)

(56) References Cited

U.S. PATENT DOCUMENTS

| | | | |
|---|---|---|---|
| 2019/0132821 A1* | 5/2019 | Goto | H04W 72/0406 |
| 2019/0174472 A1* | 6/2019 | Lee | H04L 1/1812 |
| 2019/0268924 A1* | 8/2019 | Kim | H04L 5/0078 |
| 2019/0320467 A1* | 10/2019 | Freda | H04W 74/0833 |

* cited by examiner

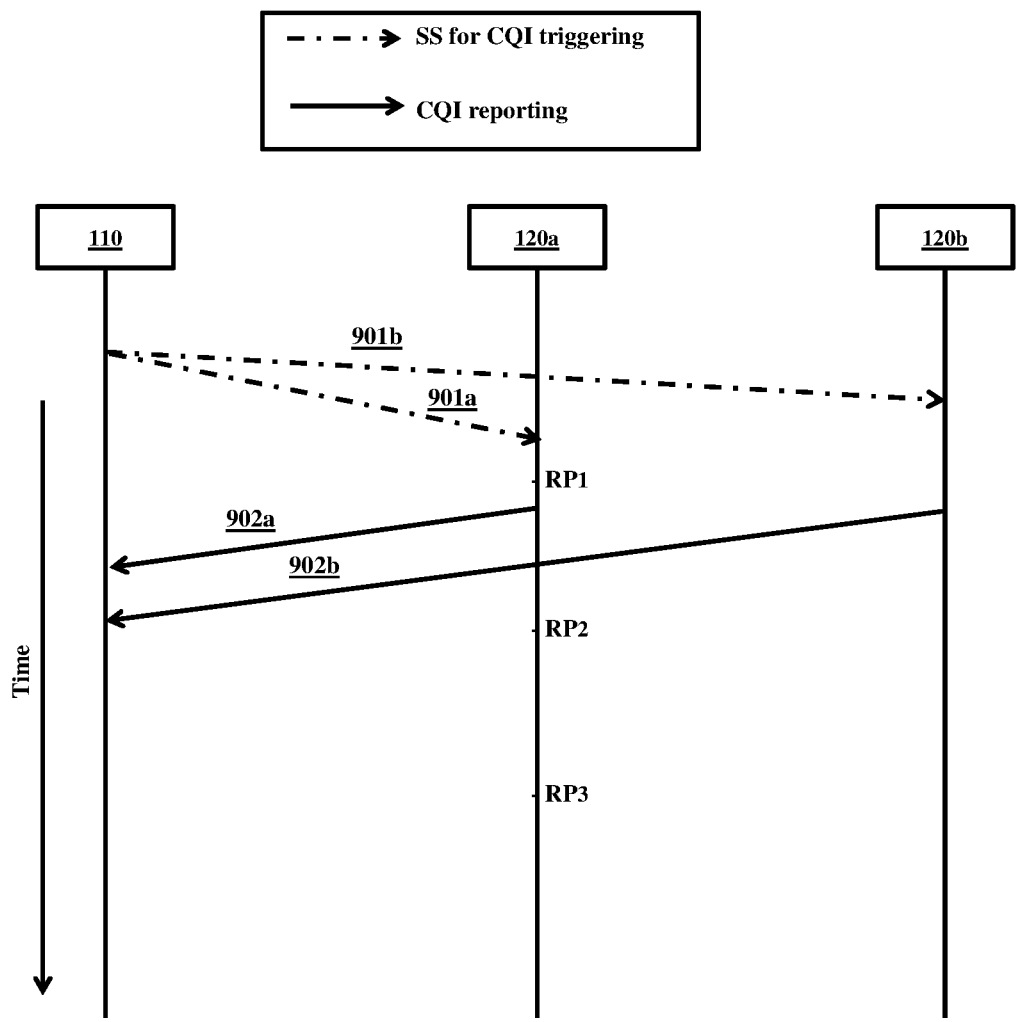

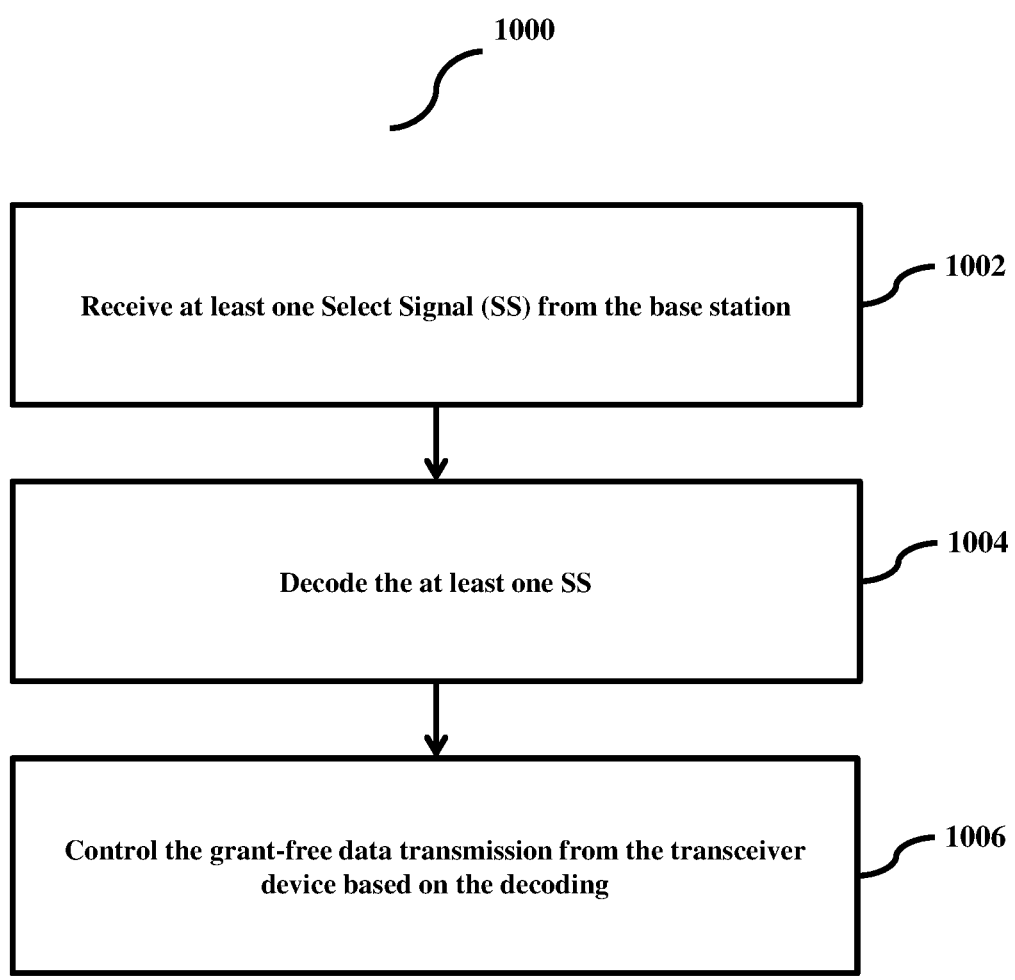

METHOD AND APPARATUS FOR MANAGING GRANT-FREE DATA TRANSMISSION IN RADIO COMMUNICATION NETWORK

TECHNICAL FIELD

The present disclosure relates in general to wireless communication and more particularly to a method and apparatus for managing a grant-free data transmission in a radio communication network. The present application is based on, and claims priority from an Indian Application Number 201741000732 filed on 7 Jan. 2017 the disclosure of which is hereby incorporated by reference.

BACKGROUND

Consider a wireless radio communication system consisting of a plurality of nodes. Each node can be considered to be either user equipment (UE) or Base Station (BS). Both the UE and BS have the same basic functionalities related to transmission and reception of data resources, except the BS has control over scheduling a grant for each communication with the UE. The grant, herein, represents an allocation in a time-frequency grid along with other relevant information like modulation and coding scheme, waveform, power, multiple access schemes etc. This type of communication with an explicit grant provided by the BS is considered as a grant-based data communication.

A grant-free data communication scenario is where nodes perform transmission with no explicit scheduling grants of time-frequency resources. But the transmissions are aligned at symbol/mini-slot/slot/sub frame level. The requirement for the grant-free data communication comes from the design constraints on transmission delay and energy efficiency for certain applications. In the context of the 3GPP new radio (NR) standards, the ultra-reliable low latency communication (URLLC) and massive machine type communication (mMTC) devices are expected to have such constraints on delay and energy efficiency, respectively.

The URLLC traffic transmission has to be 'arrive and go' in nature and with extreme sensitivity to delay cannot be subject to the latency due to signalling and scheduling as in the traditional scheduling based transmissions. The mMTC traffic on the other hand is primarily uplink transmission, and delay tolerant. However, these mMTC devices have to be highly energy efficient as they are expected to last for long time periods (~10 years) with no access to an external power source. Therefore, the signalling involved in the traditional scheduling based communications that consumes power should be avoided for the longevity of the devices.

Arrive and go nature of the grant-free data communications allows multiple nodes to transmit at the same time on overlapping resources. These set of resources are either pre-allocated or chosen dynamically at the start of transmission. The pre-allocated resource could be decided and indicated during network initialization for the different devices such as the URLLC and the mMTC depending upon cell in which it is used and/or UE identity, where a cell could be identified using a cell ID or base-station ID.

Even though the grant-free data communications provides an efficient solution to satisfy the delay and energy efficiency requirements, there are a lot of design issues involved in a system where there is no control over the transmissions in the network. For large deployments operating in a grant-free manner, the major factor to take into consideration is the collision. Due to collisions, the grant-free data communications may lose out on one more important design constraint-reliability. From the above discussions, it is concluded that either having no control or full control over the transmissions in the network does not satisfy the design constraints on delay, reliability and energy efficiency.

SUMMARY

Accordingly embodiments herein provide a method and apparatus for managing a grant-free data transmission in a radio communication network. The proposed method includes composing, by a BS, at least one SS for at least one transceiver device, where the SS is configured to control the grant-free data transmission from the at least one transceiver device. Further, the proposed method includes transmitting, by the BS, the SS to the at least one transceiver device.

In an embodiment, where the grant-free data transmission from the at least one transceiver device comprises one of a fresh data transmission, a data retransmission and a Channel Quality Indicator (CQI) reporting.

In an embodiment, where the at least one SS comprises a 1-bit of information indicating on one of an activation of the grant-free data transmission from the at least one transceiver device and a deactivation of the grant-free data transmission from the at least one transceiver device, where the 1-bit of information is transmitted as L1 signalling.

In an embodiment, where the at least one SS comprises a plurality of bits of information indicating transmission parameters required for the grant-free data transmission from the at least one transceiver device, where the plurality of bits of information are transmitted as at least one of a L1 signalling and a RRC signalling.

In an embodiment, the transmission parameters, for one of a fresh data transmission and a data retransmission, comprises at least one of: at least one bit from the plurality of bits transmitted as the L1 signalling indicating one of an activation of the grant-free data transmission from the at least one transceiver device and a deactivation of the grant-free data transmission from the at least one transceiver device, and at least one bit from the plurality of bits transmitted as at least one of the L1 signalling and the RRC signalling indicating at least one of a modulation and coding Scheme (MCS), a Resource Position (RP), a scheduling pattern, an orthogonal sequence, a resource allocation, a multiple access signature, a waveform configuration, a transmit power allocation, a number of retransmissions and transmissions to defer.

In an embodiment, the transmission parameters, for a CQI reporting, comprises at least one of: at least one bit from the plurality of bits indicating one of an activation of the grant-free data transmission from the at least one transceiver device and a deactivation of the grant-free data transmission from the at least one transceiver device which is transmitted as the L1 signalling, and at least one bit from the plurality of bits comprises at least one of a transmit power information, a reference signal information, a sub-band information, a CQI type, and a measurement configuration which is transmitted as at least one of the L1 signalling and the RRC signalling.

In an embodiment, where the transmission parameters are dynamically one of configured and reconfigured based on at least one of the L1 signalling and the RRC signalling.

In an embodiment, where the transmission parameters are dynamically determined based on a type of the grant-free data transmission intended by the at least one transceiver device, and where the type of the grant-free data transmission is one of a fresh data transmission, a data retransmission and a CQI reporting.

In an embodiment, where composing by the BS the at least one SS for at least one transceiver device comprises: receiving a preamble sequence from the at least one transceiver device; and composing the SS for a fresh data transmission at the at least one transceiver device without grant based on the preamble sequence.

In an embodiment, where the at least one SS is transmitted by performing one of a SS key encryption and a cyclic redundancy check (CRC) sequence scrambling by using one of a transceiver identifier and a transceiver group identifier.

In an embodiment, where composing by the BS the at least one SS for at least one transceiver device comprises: receiving at least one fresh data transmission from the at least one transceiver device, and composing the SS for the data retransmission without grant from the at least one transceiver device based on the at least one fresh data transmission.

In an embodiment, where the at least one SS is transmitted by performing one of a SS key encryption and a cyclic redundancy check (CRC) sequence scrambling by using one of a transceiver identifier and a transceiver group identifier.

Accordingly embodiments herein provide a method for managing a grant-free data transmission in a radio communication network. The proposed method includes controlling by a BS the grant-free data transmission from a transceiver device based on at least one of a Radio Resource Control (RRC) signalling and a L1 signalling.

In an embodiment, where controlling the grant-free data transmission from the transceiver device based on at least one of the RRC signalling and the L1 signalling comprises: composing at least one of a SS to control the grant-free data transmission from the transceiver device, where the SS comprise one of a 1-bit of information indicating one of an activation of the grant-free data transmission and a deactivation of the grant-free data transmission from the transceiver device, and a plurality of bits indicating transmission parameters required for the grant-free data transmission from the at least one transceiver device, and transmitting at least one of the SS using at least one of the RRC signalling and the L1 signalling.

Accordingly embodiments herein provide a method for managing a grant-free data transmission in a radio communication network. The proposed method includes receiving, by a transceiver device, at least one Select Signal (SS) from a BS. Further, the proposed method includes decoding, by the transceiver device, the at least one SS. Furthermore, the proposed method includes controlling, by the transceiver device, the grant-free data transmission from the transceiver device based on the decoding.

In an embodiment, where controlling, by the transceiver device, the grant-free data transmission from the transceiver device based on the decoding comprises at least one of: activating the grant-free data transmission from the transceiver device in response to successful decoding of the at least one SS, deactivating the grant-free data transmission from the transceiver device in response to unsuccessful decoding of the at least one SS, and performing the grant-free data transmission based on the transmission parameter from the at least one SS in response to successful decoding of the at least one SS.

In an embodiment, where the SS is decoded by the transceiver device intended to perform the grant-free data transmission at a pre-determined time interval.

In an embodiment, where decoding the at least one SS comprises performing one of a SS key decryption and a cyclic redundancy check (CRC) sequence descrambling using on one of a transceiver identifier of the transceiver and a group identifier for the transceiver.

Accordingly, the embodiments herein provide a BS for managing a grant-free data transmission in a radio communication. The BS includes a memory, a processor, and a Select Signal (SS) composer, operably coupled to the processor and the memory. The SS composer configured to: compose at least one SS for at least one transceiver device, where the SS is configured to control the grant-free data transmission from the at least one transceiver device, and transmit the SS to the at least one transceiver device.

Accordingly, the embodiments herein provide a BS for managing a grant-free data transmission in a radio communication network. The BS includes a memory, a processor and a SS composer, operably coupled to the processor and the memory, configured to control the grant-free data transmission from a transceiver device based on at least one of a Radio Resource Control (RRC) signalling and a L1 signalling.

Accordingly, the embodiments herein provide a transceiver device for managing a grant-free data transmission in a radio communication network. The transceiver device includes a memory, a processor, and a select signal analyzer, operably coupled to the processor and the memory, configured to: receive at least one Select Signal (SS) from a BS, decode the at least one SS, and control the grant-free data transmission from the transceiver device based on the decoding.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method is illustrated in the accompanying drawings, throughout which like reference letters indicate corresponding parts in the various figures. The embodiments herein will be better understood from the following description with reference to the drawings, in which:

FIG. 9 is a sequence diagram illustrating a method for managing a CQI reporting using the SS, according to an embodiment as disclosed herein; and FIG. 10 is a flow diagram illustrating a method for managing the grant-free data transmission by decoding the SS, according to the embodiment as disclosed herein.

DETAILED DESCRIPTION OF INVENTION

Figure 1:
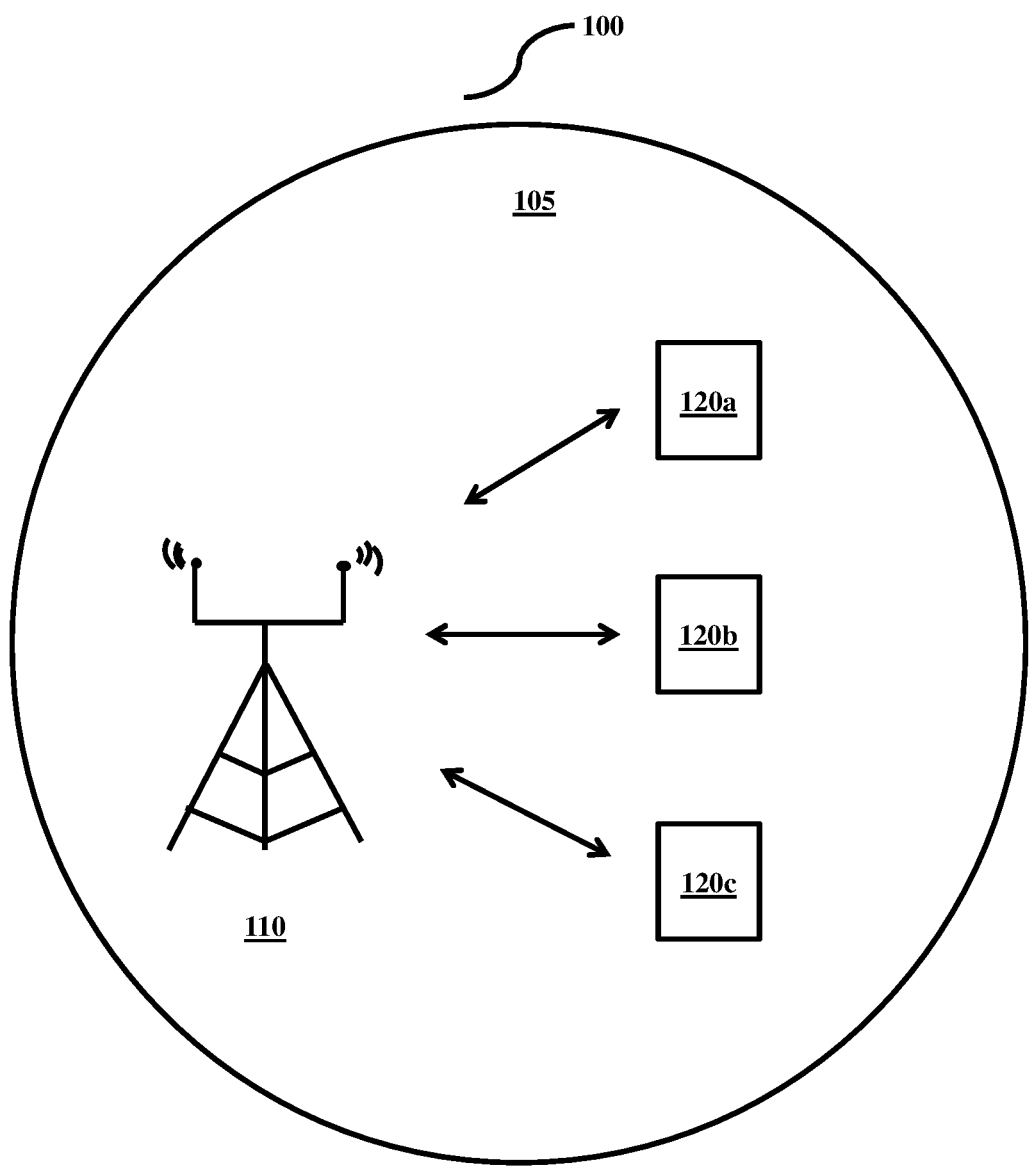
FIG. 1 is an example illustrating a radio communication network in which a BS is communicating with transceiver devices for managing a grant-free data transmission, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly embodiments herein provide a method for managing a grant-free data transmission in a radio communication network. The proposed method includes composing, by a Base Station (BS), at least one Select Signal (SS) for at least one transceiver device, where the SS is configured to control a the grant-free data transmission without grant from the at least one transceiver device. Further, the proposed method includes transmitting, by the BS, the SS to the at least one transceiver device.

Unlike to conventional methods and systems, the proposed method can be used to achieve a multi-user diversity (MUD), automatically reduce a collision between the data transmission of the transceiver devices and improve an energy efficiency of the transceiver devices by means of the SS transmitted by the BS during the grant-free data transmission.

Another object of the embodiments herein is to compose at least one Select Signal (SS), for at least one transceiver device for controlling the grant-free data transmission.

Another object of the embodiments herein is to control the grant-free data transmission from the transceiver device based on at least one of a Radio Resource Control (RRC) signalling and a Layer 1 (L1) signalling.

Another object of the embodiments herein is to control one of a fresh data transmission and a data retransmission using an indication provided through L1 signalling, where the indication indicates one of activation and deactivation of the grant-free data transmission from the transceiver device.

Referring now to the drawings, and more particularly to FIGS. 1 through 10, there are shown preferred embodiments.

FIG. 1 is an example illustrating a radio communication network 100 in which a BS 110 is communicating with plurality of transceiver devices 120a-120c for managing a grant-free data transmission, according to an embodiment as disclosed herein. The BS 110 can be, but not limited to a cellphone tower, LTE network tower, 5G tower, an eNodeB (eNB), an access network, and the like. The transceiver devices 120a-120c can be, but not limited a transmitter, a receiver, an eNb, another BS, a User Equipment (UE), a Mobile station, an electronic device, etc., which can communicate with the BS 110.

In conventional methods and systems, the BS 110 manages uplink and downlink communications for the plurality of transceiver devices 120a-120c (hereinafter referred as a transceiver device 120) within a coverage area 105. The BS 110 may support transmissions for multiple cellular carriers concurrently.

The grant-free data transmission may be defined by the BS 110, or it may be set in a wireless standard (e.g., 3GPP), In general, when a collision occurs between the data transmissions, the transceiver device 120 may resolve collisions using an asynchronous HARQ (hybrid automatic repeat request) method. The BS 110 blindly (i.e., without explicit signalling) detects active transceiver device 120 and decodes the received uplink transmissions.

In the grant-free data communication, the transceiver device 120 may send uplink transmissions without the BS 110 allocating resources to request/grant mechanisms. Therefore, a total network overhead resources are saved. Furthermore, this system allows for time savings during uplink by bypassing the request/grant scheme. Although only one BS 110 and three transceiver devices 120a-120c (alternatively referred as transceiver device 120) are illustrated in FIG. 1, the communication network may also include multiple BS each covering transmissions from a varying multitude of transceiver devices in its coverage area.

The communication network 100 uses various high level signalling mechanisms to enable and configure grant-free transmissions. The transceiver device 120 is capable for grant-free transmissions with the BS 110. This allows BS 110 to support both grant-free transmissions and traditional signal/grant transmissions simultaneously. The relevant transceiver device 120 may signal the grant-free transmission capability by, for example, RRC (radio resource control) signalling defined in the 3GPP (third generation partnership project) standard. A new field may be added to the transceiver device 120 capability list in RRC signalling to indicate whether the transceiver device 120 supports grant-free transmissions. Alternatively, one or more existing fields can be modified or inferred from in order to indicate grant-free support.

The BS 110 also uses any one of high-level mechanisms (e.g., a broadcast channel, a multicast channel, a unicast channel and the like) to notify the transceiver device 120 of information necessary to enable and configure the grant-free data transmission. For example, BS 110 may signal the transceiver device 120 that it supports the grant-free data transmissions, its search space and access codes for the a maximum size of a signature set (i.e., the total number of signatures defined), a modulation and coding scheme (MCS) setting, and the like. Furthermore, BS 110 may update this information in a memory of the BS 110 from time to time.

The advantages of the proposed method is that the BS 110 transmits a different type of signal to the transceiver devices 120a-120c indicating whether to activate, deactivate or modify the grant-free data transmissions or the data re-transmissions based on the BS 110 capabilities and a collision control.

Figure 2:
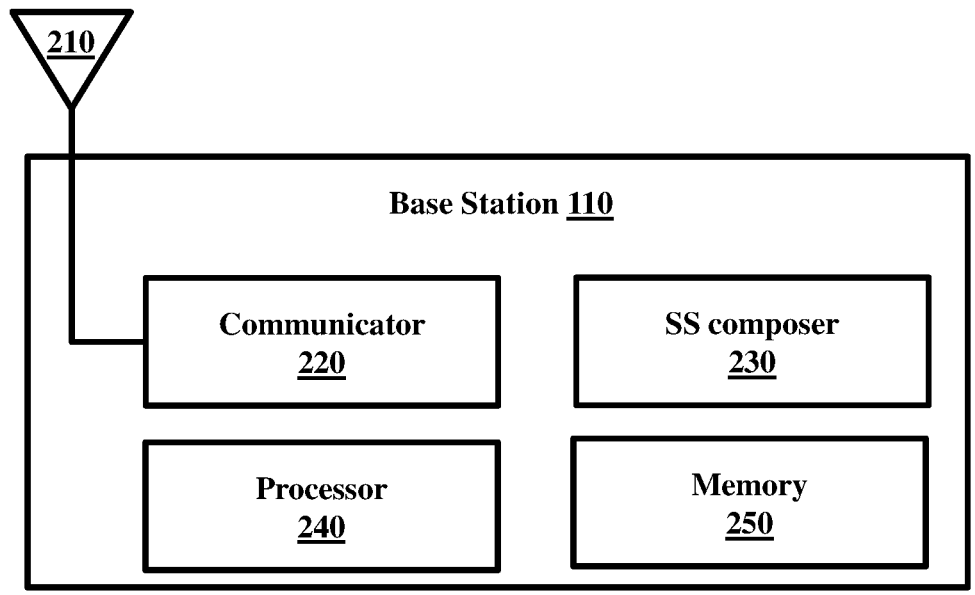
FIG. 2 is a block diagram illustrating various hardware components of the BS, according to an embodiment as disclosed herein.

FIG. 2 is a block diagram illustrating various hardware components of the BS 110, according to an embodiment as disclosed herein. The BS 110 includes a communicator 220, a SS composer 230, a processor 240, and a memory 250.

The communicator 220 coupled with antenna 210, can be configured to communicate with the various other apparatus over the wireless radio communication network 100 (shown in FIG. 1). The various other apparatus includes, for e.g., other base stations (not shown in this FIG.), the transceiver devices 120 (shown in FIG. 1) in the wireless radio communication network 100. Further, the communicator 220 can be configured to internally communicate with other components of the BS 110.

The SS composer 230 is communicatively coupled to the communicator 220 and the processor 240. The SS composer 230 can be configured to compose the SS for the transceiver device 120, wherein the SS is configured to control the grant-free data transmission from the at least one transceiver device 120. In an embodiment, the SS is used to select a subset of the total number of transceiver 120 expected to perform the data transmission (including data retransmission, CQI reporting, and the like). The BS 110 composes the SS in such a way that only the transceiver device 120 required to make the data transmission at a specific time will be able to decode it thereof. For e.g., only the transceiver device 120b (shown in FIG. 1) can selected to sense the presence of the SS by means of a unique identification tag. In another e.g., the BS 110 can select the transceiver device 120b based on the collision, with respect to data transmission, associated therewith.

In an embodiment, the unique identification tag can be a an ID, a group ID or any other form of temporary ID for the transceiver device 120 which is either allocated semi-statically or dynamically in time. It is assumed that the set of resources used for data transmission are called a Resource Position (RP) which encompasses the time frequency allocation.

In an embodiment, the BS 110 can be configured to compose the SS to control at least one of the fresh data transmission, the data retransmission and a CQI reporting.

SS for Controlling Fresh Data Transmission:

In this scenario, the BS 110 receives a preamble sequence from the at least one transceiver device 120, thereafter, compose the SS for the at least one transceiver device 120. The SS controls the fresh data transmission at the transceiver device 120, without grant based on the preamble sequence (as detailed in congestion with the FIG. 4).

SS for Controlling Data Re-Transmission:

In this scenario, the BS 110 receives at least one fresh data transmission from the at least one transceiver device 120, thereafter, compose the SS for the at least one transceiver device 120. The SS controls the data re-transmission, at the transceiver device 120, without grant based on the fresh data transmission (as detailed in conjunction with FIG. 6 and FIG. 7).

In an embodiment, the BS 110 transmits the SS to the at least one transceiver device 120 by performing one of a SS key encryption and a cyclic redundancy check (CRC) sequence scrambling by using one of a transceiver identifier and a transceiver group identifier.

In an embodiment the SS key encryption is defined as the SS that can be a common key which can be encrypted using the transceiver device IDs/group ID/temporary IDs required to make the transmission at the RP.

In an embodiment the cyclic redundancy checks (CRC) scrambling can be defined as the cyclic redundancy checks (CRC) which can be scrambled by the transceiver device IDs/group ID/temporary ID required to make the transmission at a RP.

The processor 240 performs actions based on the instructions provided by the SS composer 230. The processor 240 can be for e.g., a hardware unit, an apparatus, a Central Processing Unit (CPU), a Graphics Processing Unit (GPU).

The memory 250 includes storage locations to be addressable through the processor 240. The memory 250 are not limited to a volatile memory and/or a non-volatile memory. Further, the memory can include one or more computer-readable storage media. The memory 250 may include non-volatile storage elements. For example non-volatile storage elements may include magnetic hard discs, optical discs, floppy discs, flash memories, or forms of electrically programmable memories (EPROM) or electrically erasable and programmable (EEPROM) memories. In some examples the memory 250 can be configured to store larger amount of applications (i.e. Virtual assistants, or calling applications) stored therein to provide one or more services to the user. Further, the memory 250 can store the transmission parameters required for the data transmission without grant.

Figure 3:
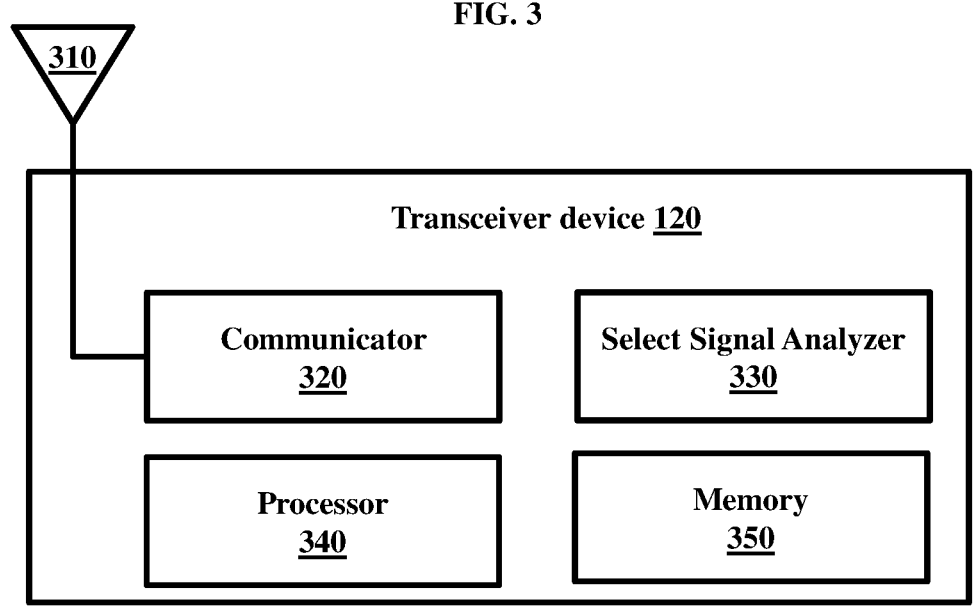
FIG. 3 is a block diagram illustrating various hardware components of a transceiver device, according to an embodiment as disclosed herein.

FIG. 3 is a block diagram illustrating various hardware components of the transceiver device 120, according to an embodiment as disclosed herein. The transceiver device 120 includes a communicator 320, a select signal analyzer 330, a processor 340, and a memory 350.

The communicator 320 is coupled with antenna 310, can be configured to communicate with the various other apparatus over the wireless radio communication network 100 (shown in FIG. 1). The various other apparatus includes, for e.g., other base stations (not shown in this FIG.), the transceiver devices 120 (shown in FIG. 1) in the wireless radio communication network 100. Further, the communicator 320 can be configured to internally communicate with other components of the BS 110.

The select signal analyzer 330 is communicatively coupled to the communicator 320 and the processor 340. The select signal analyzer 330 receives the SS through the communicator 320 and decodes the SS by performing a SS key decryption and cyclic redundancy checks (CRC) sequence descrambling using on one of a transceiver device identifier and a transceiver group identifier. Further, the select signal analyzer 330 activates the grant-free data transmission from the transceiver device 120 in response to successful decoding of the at least one SS and deactivates the grant-free data transmission from the transceiver device 120 in response to unsuccessful decoding of the at least one SS.

In an embodiment, the select signal analyzer 330 performs the grant-free data transmission based on a transmission parameter from the at least one SS, in response to successful decoding of the at least one SS at a pre-determined time interval.

The processor 340 performs actions based on the instructions provided by the select signal analyzer 330. The processor 340 are not limited to a hardware unit, an apparatus, a Central Processing Unit (CPU), a Graphics Processing Unit (GPU).

The memory 350 includes storage locations to be addressable through the processor 340. The memory 350 are not limited to a volatile memory and/or a non-volatile memory. Further, the memory can include one or more computer-readable storage media. The memory 350 may include non-volatile storage elements. For example non-volatile storage elements may include magnetic hard discs, optical discs, floppy discs, flash memories, or forms of electrically programmable memories (EPROM) or electrically erasable and programmable (EEPROM) memories. In some examples the memory 350 can be configured to store larger amount of applications stored therein to provide one or more services to the user. Further, the memory 350 can store the transmission parameters required for the data transmission without grant.

Figure 4:
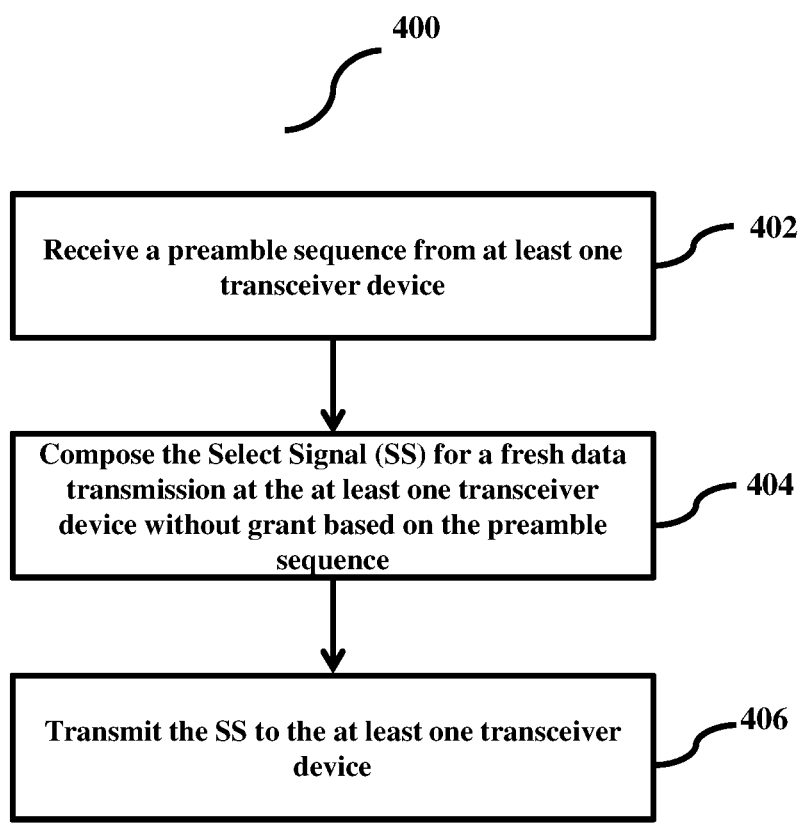
FIG. 4 is a flow diagram illustrating a method for managing a data transmission using the SS, according to the embodiment as disclosed herein.

FIG. 4 is a flow diagram illustrating a method for managing the data transmission (fresh) using the SS, according to the embodiment as disclosed herein. At step 402, the method includes receiving a preamble sequence from the transceiver device 120. In an embodiment, the method allows the communicator 220 to receive the preamble sequence from the transceiver device 120.

At step 404, the method includes composing the SS for the fresh data transmission at the transceiver device 120 without grant. In an embodiment, the method allows the SS composer 230 to compose the SS for the fresh data transmission at the transceiver device 120 without grant based on the preamble sequence.

At step 406, the method includes transmitting the SS to the transceiver device 120. In an embodiment, the method allows the communicator 220 to transmit the SS to the transceiver device 120.

Figure 5:
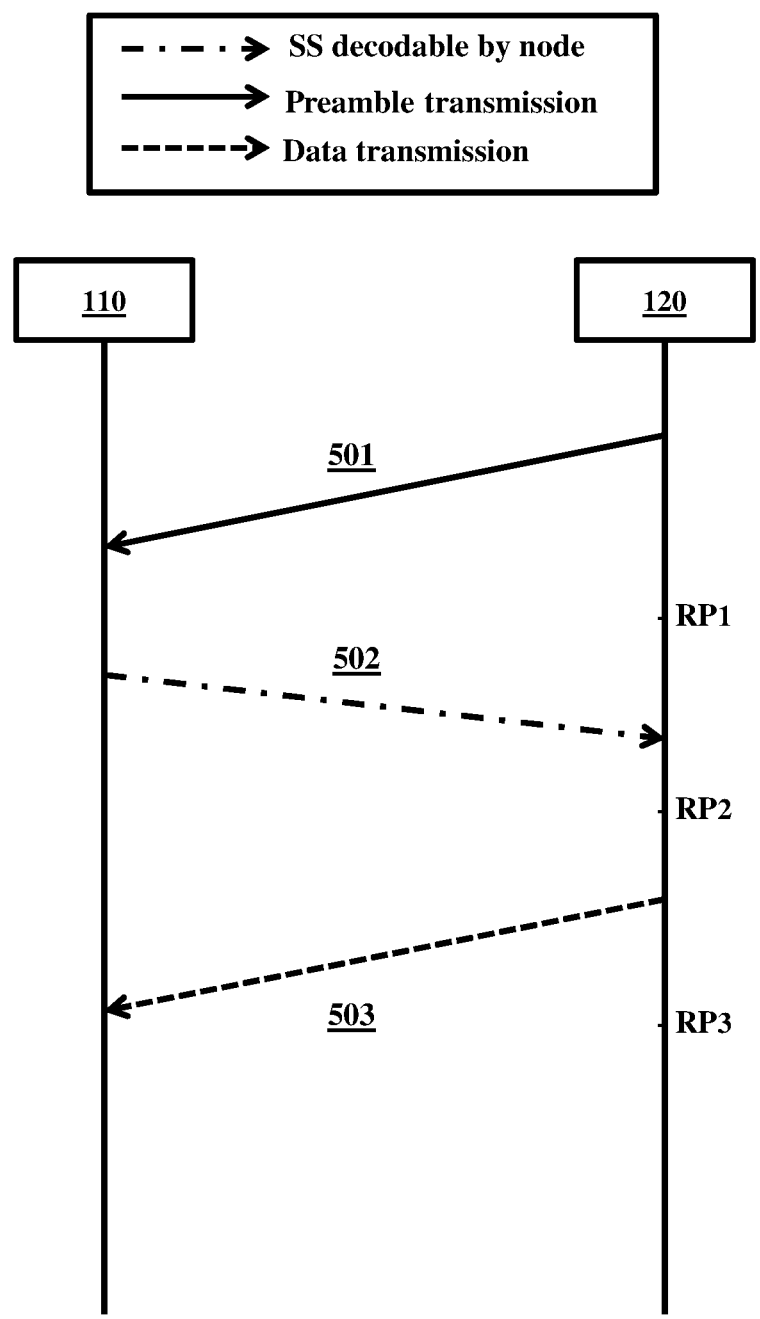
FIG. 5 is a sequence diagram illustrating a data transmission using SS, according to an embodiment as disclosed herein.

FIG. 5 is a sequence diagram illustrating a data transmission using the SS composed by the BS, according to an embodiment as disclosed herein;

In an embodiment, the transceiver device 120 first transmits 501 the preamble sequence at RP1 to the BS 110. The BS 110 decodes the preamble sequence and detects that the preamble sequence is from the transceiver device 120. Once the BS 110 has successfully decoded the preamble sequence, the BS 110 is aware of the RP (i.e., RP1) of the fresh data transmission. For example, the BS 110 is aware that the transceiver device 120 could like to perform the fresh data transmission at RP1.

The transceiver device 120 does not perform the fresh data transmission until the transceiver device 120 receives an acknowledgement of successful detection of the transceiver device 120 or the decoding of the preamble sequence, from the BS 110. Therefore, the BS 110 composes the SS to control the fresh data transmission from the transceiver device 120. The SS can include, but not limited to the RP information at which the fresh data transmission should be performed, the scheduling pattern, the orthogonal sequence, the resource allocation, the multiple access signature and the like. For example, the BS 110 composes the SS and transmits 502 the SS to the transceiver device 120. The SS, therefore, allows the transceiver device 120 to perform the fresh data transmission 503 at the RP3 instead of RP1 due to a collision of other data transmissions from the transceiver device 120 at RP1.

Figure 6:
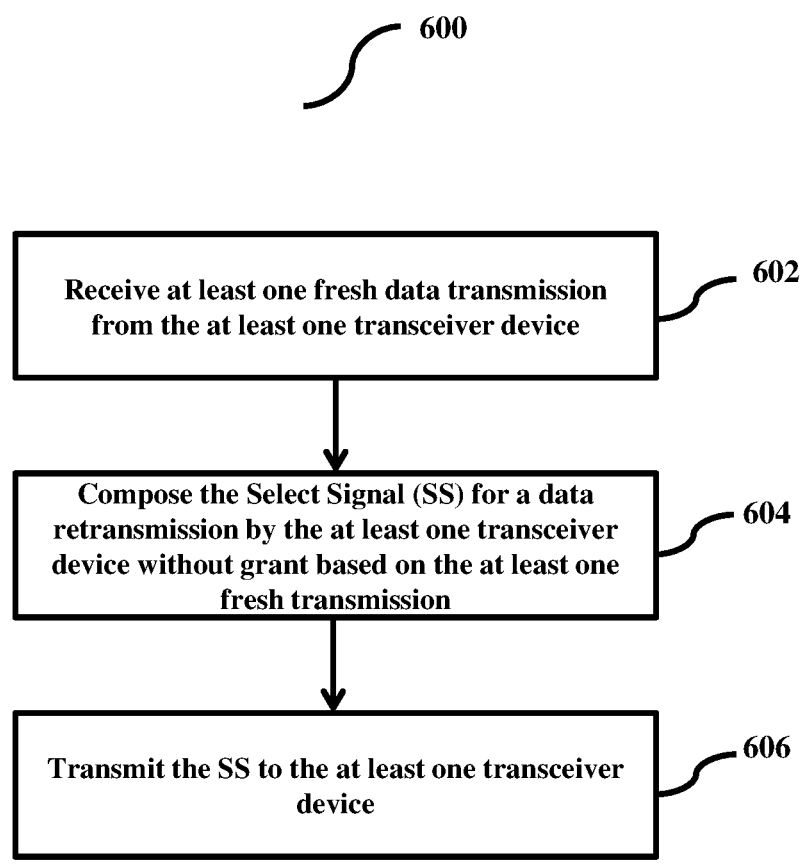
FIG. 6 is a flow diagram illustrating a method for managing a data re-transmission using the SS, according to the embodiment as disclosed herein.

FIG. 6 is a flow diagram illustrating a method for managing a data re-transmission using the SS, according to the embodiment as disclosed herein. At step 602, the method includes receiving the fresh data transmission from the transceiver device 120. In an embodiment, the method allows the communicator 210 receives the fresh data transmission from the transceiver device 120.

At step 604, the method includes composing the SS for the data re-transmission without grant based on the fresh data transmission provided by the transceiver device 120. In an embodiment, the method allows the SS composer 230 to compose the SS for the data re-transmission without grant based on the fresh data transmission provided by the transceiver device 120.

At step 606, the method includes transmitting the SS to the transceiver device 120. In an embodiment, the method allows the communicator 210 to transmit the SS to the transceiver device 120.

Figure 7:
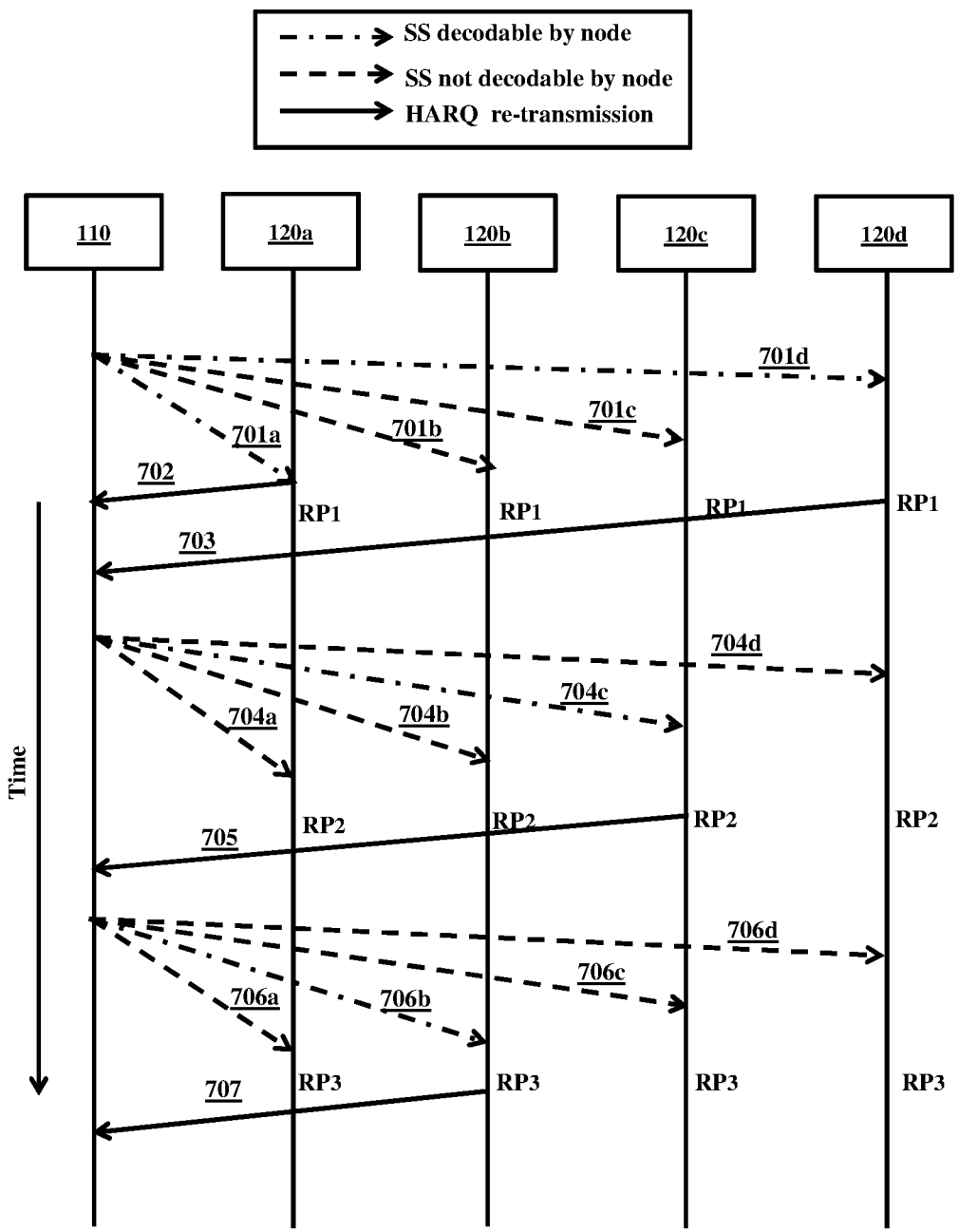
FIG. 7 a sequence diagram illustrating a method for performing HARQ scheme using the SS, according to an embodiment as disclosed herein.

FIG. 7 a sequence diagram illustrating a method for performing HARQ scheme using the SS, according to an embodiment as disclosed herein.

In a communication scenario, when the fresh data transmission of data packets fails, then the retransmission needs to be made to ensure reliability. A Hybrid ARQ (HARQ) is introduced to enable a quick retransmission and achieve the required error probability (reliability) for a given signal to interference plus noise ratio (SINR). The re-transmission signal could be either the failed data packet information or any additional redundant information. The HARQ mechanism can be classified as being either synchronous or asynchronous. In the case of a synchronous HARQ, the receiving node is aware of a Radio Position/Resource Position (RP) in which it receives the HARQ re-transmission and is predefined by standards. On the other hand, in an asynchronous HARQ, the receiving node is informed of the RP in which it receives the HARQ re-transmission by means of a control channel.

Both synchronous and asynchronous HARQ mechanisms have advantages and disadvantages. The synchronous HARQ has the advantage of the less signalling because the next HARQ re-transmission information is available to receiving node through the implicit relationship thereby not requiring any communication from the transmitting node. However, the disadvantage is that the synchronous HARQ technique cannot exploit an inherent Multi-User Diversity (MUD) present in the system as the technique cannot choose one user over the other for the HARQ re-transmissions. In the case of asynchronous HARQ, the MUD can be exploited by signalling to the nodes individually. But the disadvantage of asynchronous HARQ is the signalling overhead involved.

Referring to FIG. 7, consider a grant-free communication scenario where, the HARQ re-transmissions are synchronous. The BS 110 transmits 701a-701d the SS to the plurality of transceiver devices 120a-120d. All the plurality of transceiver devices 120a-120d are implicitly aware of the Radio Position RP1-RP3 through a formula offset or tightly coupled with a system timing.

The SS includes a 1-bit of information indicating one of an activation of the grant-free data transmission from the transceiver device 120 and a deactivation of the data transmission from the transceiver device 120. In an embodiment, the 1-bit of information is transmitted as a L1 signalling. Further the SS includes a plurality of bits of information indicating transmission parameters required for the grant-free data transmission from the transceiver device 120, where the plurality of bits of information are transmitted through one of the L1 signalling and a RRC signalling.

The transmission parameters for a fresh data transmission and data re-transmission can be one of a modulation and coding Scheme (MCS), a Resource Position (RP), a scheduling pattern, an orthogonal sequence, a resource allocation, a multiple access signature, a waveform configuration, a transmit power allocation, a number of retransmissions and retransmissions to defer.

The BS 110 transmits 701 the SS to the transceiver device 120 by performing one of a SS key encryption and cyclic redundancy checks (CRC) sequence scrambling by using one of a transceiver identifier and transceiver group identifier.

The principle behind a SS-HARQ is that by means of a SS 701, only a certain number of transceiver devices 120a-120d will be allowed to perform the HARQ re-transmission at RP1. The SS for HARQ re-transmission, is either effectively used to defer the HARQ re-transmission at the RP1 for the plurality of transceiver devices because the conditions are not favorable for a successful detection or it is used to select the plurality of transceiver devices to perform HARQ re-transmission at the RP1 because the conditions are beneficial for the successful detection.

The SS-HARQ scheme is pseudo-asynchronous as the HARQ re-transmission might not take place at regular intervals. However, as the transceiver device 120 are aware of the RP (i.e., RP1 to RP3), extra signalling is not required as in the case of pure asynchronous. The argument against using full control over the transmissions apart from not satisfying the delay constraints is the prohibitive signalling overhead involved in informing all the transceiver devices 120 in the network. Here it is seen that by using the SS, the overhead due to signalling is reduced as the transceiver device 120 can decode the SS at the same time.

As seen from FIG. 7, the BS 110 transmits 701 (i.e., 701a to 701d) to the plurality of transceiver devices 120a-120d at RP1. The plurality of transceiver devices 120a-120d are allowed for HARQ re-transmission at RP1 if the SS is decodable. For example, if a transceiver 120a and a transceiver 120d can decode the SS, then the transceiver 120a performs the HARQ re-transmission 702 and the transceiver 120d performs the HARQ re-transmission 703 with the BS 110. The transceiver devices 120b and 120c does not perform the HARQ re-transmission because it is failed to decode the SS 701.

In another example, the BS 110 transmits 704 (i.e., 704a to 704d) the SS to the plurality of transceiver devices 120a-120d at RP2. If the transceiver device 120a can only decode the SS then the transceiver device 120a performs the HARQ re-transmission 705 with the BS 110 at RP2.

In another example, the BS 110 transmits 706 (i.e., 706a to 706d) the SS to the plurality of transceiver devices 120a-120d at RP3. If the transceiver device 120a can only decode the SS then the transceiver device 120a performs the HARQ re-transmission 707 with the BS 110 at RP3.

The plurality of transceiver devices 120a-120d are allowed to transmit the data at RP1 to RP3 when it is conducive to them. Thus, by means of the SS, the MUD inherently present in the network can be exploited with a reduced signalling overhead. Thereby satisfying the reliability criterion of a design KPI.

With respect to the $m^{th}$ node in the network from FIG. 7, if the total number of HARQ re-transmission is n, then only k (<n) out of the n HARQ re-transmission are allowed. This is a form of selection diversity where only certain data transmissions among the total are selected. By doing so, the SS-HARQ also satisfies the power efficiency criterion of the design KPI by preventing unnecessary HARQ re-transmission and conserving power.

Figure 8:
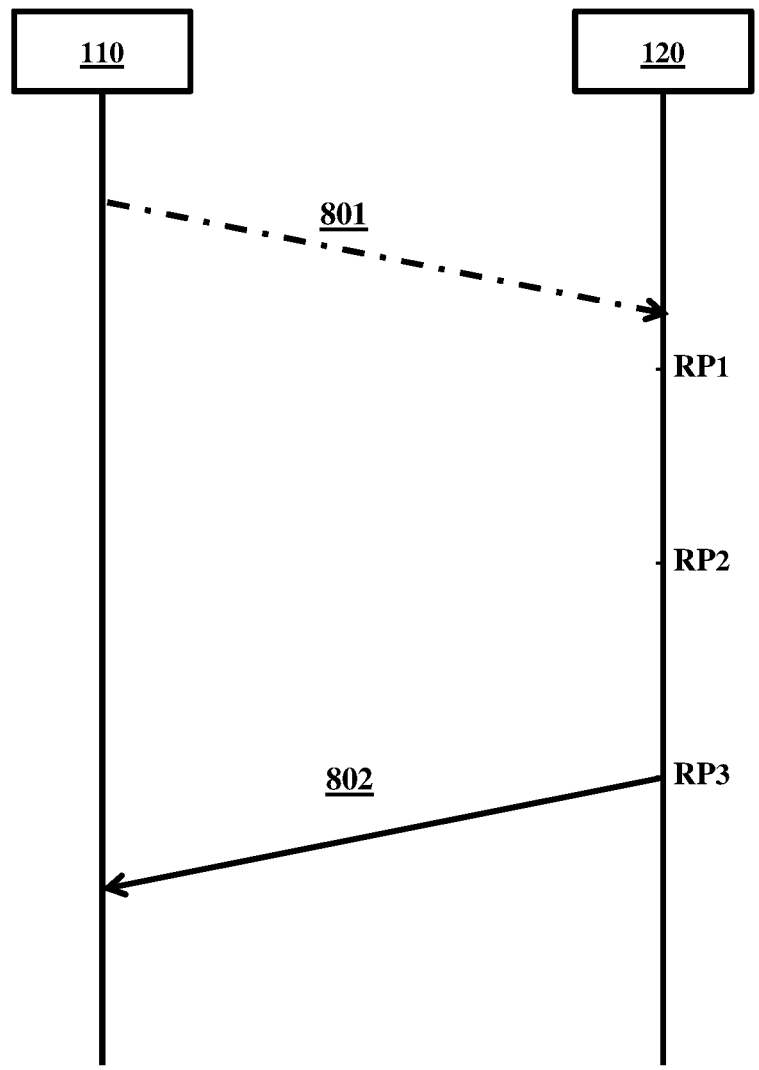
FIG. 8 is a sequence diagram illustrating a method for indicating re-transmissions, defer by p HARQ using the SS, according to an embodiment as disclosed herein.

FIG. 8 is a sequence diagram illustrating a method for indicating re-transmissions, defer by p HARQ using the SS, according to an embodiment as disclosed herein.

In an embodiment, the BS 110 can be configured to compose the SS based on a failure in the fresh data transmission. The SS having the 1-bit of information indicating the transceiver device 120 to perform the p HARQ re-transmission at the same RP where the fresh data transmission is performed or at the different RP For example, when there is the failure in the fresh data transmission at RP3, the BS 110 compose the SS and transmit 801 the SS to the transceiver device 120 suggesting the transceiver device 120 to perform the p HARQ re-transmission 802 at RP3.

FIG. 9 is a sequence diagram illustrating a method managing a CQI reporting using the SS, according to an embodiment as disclosed herein.

In a communication scenario with large density deployments, periodic measurement and/or reporting of the channel quality information (CQI) is not useful in terms of power usage as the values do not change drastically within a time period. To conserve power and reduce unnecessary signalling, CQI triggering by means of the SS is an efficient mechanism.

Referring to the FIG. 9, the BS 110 composes SS along with the CQI triggering to transmit 901 (i.e., 901a and 901b) the SS for the transceiver device 120a and the transceiver device 120b. The CQI triggering can be such that a reference signal transmission or a CQI reporting happens at a time when the BS 110 considers the previous values of the fresh data transmission to be outdated. Along with the CQI triggering, the SS also contain the transmit power information, the reference signal information, the activation/deactivation information, a beam information a common scheduling information, the sub-band information, the CQI type, and the measurement configuration which is transmitted as one of the L1 signalling and the RRC signalling.

In an embodiment, the BS 110 transmits 901a the SS having the reference signal information to the transceiver device 120a at RP1 and transmits 901b the SS having the reference signal information to the transceiver device 120b at same RP1. The reference signal information includes a transmit power information, a reference signal information, a sub-band information, a CQI type, and a measurement configuration which is transmitted as at least one of the L1 signalling and the RRC signalling. Therefore, based on the SS the transceiver device 120a performs the CQI reporting 902a with the BS 110 at RP2 and further, based on the SS the transceiver device 120*b* performs the CQI reporting 902*b* with the BS 110 at RP2.

In another embodiment, the BS 110 can transmit 901 the SS at RP1 having the activation/deactivation information to the group of transceiver devices (i.e., 120*a* and 120*b*), where the activation/deactivation information contains at least one of a reference signal transmission and channel quality reporting. The reference signal transmission and the channel quality reporting can be configured semi-persistently by the BS 110. Therefore, based on the transmit 901*a* of SS the transceiver device 120*a* performs the CQI reporting 902*a* with the BS 110 at RP2 and further, based on the transmit 901*b* of SS the transceiver device 120*b* performs the CQI reporting 902*b* with the BS 110 at RP2.

In another embodiment, the BS 110 can transmit 901 the SS at RP1 having the beam information to the group of transceiver devices (i.e., 120*a* and 120*b*), where the group of transceiver devices (i.e., 120*a* and 120*b*) belongs to a same beam. Therefore, based on the SS the transceiver device 120*a* performs the CQI reporting 902*a* with the BS 110 at RP2 and further, based on the SS the transceiver device 120*b* performs the CQI reporting 902*b* with the BS 110 at RP2.

In another embodiment, the BS 110 can transmit 901 the SS at RP1 having the common scheduling information to the group of transceiver devices (i.e., 120*a* and 120*b*), where the group of transceiver devices (i.e., 120*a* and 120*b*) could be scheduled on the same resources for CQI reporting. Therefore, based on the SS the transceiver device 120*a* performs the CQI reporting 902*a* with the BS 110 at RP2 and further, based on the SS the transceiver device 120*b* performs the CQI reporting 902*b* with the BS 110 at RP2.

FIG. 10 is a flow diagram 1000 illustrating a method for managing a grant-free data transmission by decoding, according to the embodiment as disclosed herein. At step 1002, the method includes receiving the SS from the BS 110. In an embodiment, the method allows the communicator 320 to receive the SS from the BS 110.

At step 1004, the method includes decoding the SS from the BS 110. In an embodiment, the method allows the select signal analyzer 330 to decode the SS from the BS 110. At step 1006, the method includes controlling the grant-free data transmission from transceiver device 1006 based on the decoding. In an embodiment, the method allows the select signal analyzer 330 to control the grant-free data transmission from transceiver device 120 based on the decoding.

The embodiments disclosed herein can be implemented through at least one software program running on at least one hardware device and performing network management functions to control the elements. The elements shown in the FIGS. 1 through 10 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for managing a grant-free data transmission in a radio communication network, the method comprising:

composing, by a base station, at least one Select Signal (SS) for at least one transceiver device from a plurality of transceiver devices in the radio communication network, wherein the at least one SS is configured to control the grant-free data transmission from the at least one transceiver device, wherein the at least one SS comprises one of: at least one bit of information indicating an activation of the grant-free data transmission at the at least one transceiver device, and a plurality of bits of information indicating transmission parameters, wherein at least one bit from the plurality of bits indicates an activation of the grant-free data transmission at the at least one transceiver device;

transmitting, by the base station, the at least one SS comprising one of the at least one bit of information and the plurality of bits of information of the at least one SS to the at least one transceiver, wherein one of the at least one bit of information and the plurality of bits of information of the at least one SS is transmitted as at least one of a Radio Resource Control (RRC) signalling and a Layer 1 (L1) signalling;

receiving, by the at least one transceiver device, the at least one SS from the base station using at least one of the RRC signalling and the L1 signalling, decoding, by the at least one transceiver device, the at least one SS;

activating, by the at least one transceiver device, the grant-free data transmission based on the at least one bit of the at least one SS indicating the activation of the grant-free data transmission at the at least one transceiver device, wherein the at least one transceiver device remains active until the deactivation of the grant-free transmission is indicated in the same SS;

performing, by the at least one transceiver device, the grant-free data transmission;

composing, by the base station, the at least one SS for the at least one transceiver device, wherein the at least one SS comprises one of: at least one bit of information indicating a deactivation of the grant-free data transmission at the at least one transceiver device, and a plurality of bits of information indicating transmission parameters, wherein at least one bit from the plurality of bits indicates a deactivation of the grant-free data transmission at the at least one transceiver device;

transmitting, by the base station, the at least one SS comprising to the at least one transceiver device, wherein the at least one SS is transmitted as at least one of a RRC signalling and a L1 signalling;

receiving, by the at least one transceiver device, the at least one SS from the base station using at least one of the RRC signalling and the L1 signalling, decoding, by the transceiver device, the at least one SS; and deactivating, by the at least one transceiver device, the grant-free data transmission based on the at least one bit of the at least one SS indicating the deactivation of the grant-free data transmission at the at least one transceiver device, wherein the at least one transceiver device remains deactive until the activation of the grant-free transmission is indicated in the same SS.

2. The method of claim 1, wherein the grant-free data transmission from the at least one transceiver device comprises at least one of a fresh data transmission, a data retransmission and a Channel Quality Indicator (CQI) reporting.

3. The method of claim 1, wherein the transmission parameters for at least one of a fresh data transmission and a data retransmission comprises at least one of:
- at least one bit from the plurality of bits transmitted as at least one of the L1 signalling and the RRC signalling indicating one of an activation of the grant-free data transmission at the at least one transceiver device and a deactivation of the grant-free data transmission at the at least one transceiver device, and
- at least one bit from the plurality of bits transmitted as at least one of the L1 signalling and the RRC signalling indicating at least one of a Modulation and Coding Scheme (MCS), a Resource Position (RP), a scheduling pattern, an orthogonal sequence, a resource allocation, a multiple access signature, a waveform configuration, a transmit power allocation, a number of retransmissions and retransmissions to defer.

4. The method of claim 1, wherein transmission parameters for a CQI reporting comprises at least one of:
- at least one bit from the plurality of bits indicating one of an activation of the grant-free data transmission at the at least one transceiver device and a deactivation of the grant-free data transmission at the at least one transceiver device for the grant-free data transmission which is transmitted as at least one of the L1 signalling and the RRC signalling, and
- at least one bit from the plurality of bits comprises at least one of a transmit power information, a reference signal information, a sub-band information, a CQI type, and a measurement configuration which is transmitted as at least one of the L1 signalling and the RRC signalling.

5. The method of claim 1, wherein the transmission parameters are dynamically one of configured and reconfigured based on at least one of the L1 signalling and the RRC signalling.

6. The method of claim 1, wherein the transmission parameters are dynamically determined based on a type of the grant-free data transmission intended by the at least one transceiver device, and wherein the type of the grant-free data transmission is at least one of a fresh data transmission, a data retransmission and a CQI reporting.

7. The method of claim 1, wherein composing by the base station the at least one SS for the at least one transceiver device comprises:
- receiving a preamble sequence from the at least one transceiver device; and
- composing the at least one SS for a fresh data transmission at the at least one transceiver device without grant based on the preamble sequence.

8. The method of claim 1, wherein the at least one SS is transmitted by performing one of a SS key encryption and a cyclic redundancy check (CRC) sequence scrambling by using one of a transceiver identifier and a transceiver group identifier.

9. The method of claim 1, wherein composing by the base station the at least one SS for the at least one transceiver device comprises:
- receiving at least one fresh data transmission from the at least one transceiver device; and
- composing the at least one SS for the data retransmission without grant from the at least one transceiver device based on the at least one fresh data transmission.

10. The method of claim 1, wherein the grant-free data transmission is performed at the at least one transceiver device based on the transmission parameter from the at least one SS.

11. The method of claim 1, wherein the at least one SS is decoded by the at least one transceiver device intended to perform the grant-free data transmission at a pre-determined time interval.

12. The method of claim 1, wherein decoding at least one SS comprises performing one of a SS key decryption and a cyclic redundancy check (CRC) sequence descrambling using on one of a transceiver identifier of the transceiver device and a group identifier for the at least one transceiver device.

13. The method of claim 1, wherein the at least one bit indicating the activation in the at least one SS signal and the at least one bit indicating deactivation in the at least one SS signal is one of same and different.

14. A system base station for managing a grant-free data transmission in a radio communication network, comprising:
- at least one transceiver device;
- a base station comprising:
  - a memory;
  - a processor; and
  - a Select Signal (SS) composer, operably coupled to the processor and the memory, configured to:
    - compose at least one Select Signal (SS) for the at least one transceiver device from a plurality of transceiver devices in the radio communication network, wherein the at least one SS is configured to control the grant-free data transmission from the at least one transceiver device, wherein the at least one SS comprises one of: at least one bit of information indicating an activation of the grant-free data transmission at the at least one transceiver device for the grant-free data transmission, and a plurality of bits of information indicating transmission parameters, wherein at least one bit from the plurality of bits indicates an activation of the grant-free data transmission at the at least one transceiver device;
    - transmit, the at least one SS comprising one of the at least one bit of information and the plurality of bits of information of the at least one SS to the at least one transceiver device, wherein one of the at least one bit of information and the plurality of bits of information of the at least one SS is transmitted as at least one of a Radio Resource Control (RRC) signalling and a Layer 1 (L1) signalling;
- wherein the at least one transceiver device:
  - receives the at least one SS from the base station using at least one of the RRC signalling and the L1 signalling,
  - decodes the at least one SS;
  - activates the at least one transceiver device based on the at least one bit of the at least one SS indicating the activation of the grant-free data transmission at the at least one transceiver device, wherein the at least one transceiver device remains active until deactivation of the grant-free transmission is indicated in the same SS; and
  - performs the grant-free data transmission;
- wherein said SS composer of said base station:
  - composes the at least one SS for the at least one transceiver device, wherein the at least one SS comprises one of: at least one bit of information indicating a deactivation of the grant-free data transmission at the at least one transceiver device, and a plurality of bits of information indicating transmission parameters, wherein at least one bit from the plurality of bits indicates a deactivation of the grant-free data transmission at the at least one transceiver device; and transmits the at least one SS comprising to the at least one transceiver device, wherein the at least one SS is transmitted as at least one of a RRC signalling and a L1 signalling; and wherein the at least one transceiver device:
receives the at least one SS from the base station using at least one of the RRC signalling and the L1 signalling,
decodes the at least one SS; and
deactivate the at least one transceiver device based on the at least one bit of the at least one SS indicating the deactivation of the grant-free data transmission at the at least one transceiver device, wherein the at least one transceiver device remains deactive until the activation of the grant-free transmission is indicated in the same SS.

15. The system of claim 14, wherein the grant-free data transmission from the at least one transceiver device comprises at least one of a fresh data transmission, a data retransmission and a Channel Quality Indicator (CQI) reporting.

16. The system of claim 14, wherein the transmission parameters for at least one of a fresh data transmission and a data retransmission comprises at least one of:
at least one bit from the plurality of bits transmitted as at least one of the L1 signalling and the RRC signalling indicating one of an activation of the grant-free data transmission at the at least one transceiver device and a deactivation of the grant-free data transmission at the at least one transceiver device, and
at least one bit from the plurality of bits transmitted as at least one of the L1 signalling and the RRC signalling indicating at least one of a Modulation and Coding Scheme (MCS), a Resource Position (RP), a scheduling pattern, an orthogonal sequence, a resource allocation, a multiple access signature, a waveform configuration, a transmit power allocation, a number of retransmissions and retransmissions to defer.

17. The system of claim 14, wherein the transmission parameters for a CQI reporting comprises at least one of:
at least one bit from the plurality of bits indicating one of an activation of the grant-free data transmission at the at least one transceiver device and a deactivation of the grant-free data transmission at the at least one transceiver device which is transmitted as at least one of the L1 signalling and the RRC signalling, and
at least one bit from the plurality of bits comprises at least one of a transmit power information, a reference signal information, a sub-band information, a CQI type, and a measurement configuration which is transmitted as at least one of the L1 signalling and the RRC signalling.

18. The system of claim 14, wherein the transmission parameters are dynamically one of configured and reconfigured based on at least one of the L1 signalling and the RRC signalling.

19. The system of claim 14, wherein the transmission parameters are dynamically determined based on a type of the grant-free data transmission intended by the at least one transceiver device, and wherein the type of the grant-free data transmission is at least one of a fresh data transmission, a data retransmission and a CQI reporting.

20. The system of claim 14, wherein composing by the base station the at least one SS for the at least one transceiver device comprises:
receiving a preamble sequence from the at least one transceiver device; and
composing the at least one SS for a fresh data transmission at the at least one transceiver device without grant based on the preamble sequence.

21. The system of claim 14, wherein the at least one SS is transmitted by performing one of a SS key encryption and a cyclic redundancy check (CRC) sequence scrambling by using one of a transceiver identifier and a transceiver group identifier.

22. The system of claim 14, wherein composing by the base station the at least one SS for the at least one transceiver device comprises:
receiving at least one fresh data transmission from the at least one transceiver device, and
composing the at least one SS for the data retransmission without grant from the at least one transceiver device based on the at least one fresh transmission.

23. The system of claim 14, wherein the grant-free data transmission is performed at the at least one transceiver device based on the transmission parameter from the at least one SS.

24. The system of claim 14, wherein the at least one SS is decoded by the at least one transceiver device intended to perform the grant-free data transmission at a pre-determined time interval.

25. The system of claim 14, wherein decoding at least one SS comprises performing one of a SS key decryption and a cyclic redundancy check (CRC) sequence descrambling using on one of a transceiver identifier of the transceiver device and a group identifier for the at least one transceiver device.

26. The system of claim 14, wherein the at least one bit indicating the activation in the at least one SS signal and the at least one bit indicating deactivation in the at least one SS signal is one of same and different.

27. A method for managing a grant-free data transmission in a radio communication network, the method comprising:
composing, by a base station, at least one SS for at least one transceiver device of a plurality of transceiver devices, wherein the at least one SS comprises one of: at least one bit of information indicating a deactivation of the grant-free data transmission at the at least one transceiver device, and a plurality of bits of information indicating transmission parameters, wherein at least one bit from the plurality of bits indicates a deactivation of the grant-free data transmission at the at least one transceiver device;
transmitting, by the base station, the at least one SS comprising to the at least one transceiver device, wherein the at least one SS is transmitted as at least one of a RRC signalling and a L1 signalling;
receiving, by the at least one transceiver device, the at least one SS from the base station using at least one of the RRC signalling and the L1 signalling,
decoding, by the transceiver device, the at least one SS;
deactivating, by the at least one transceiver device, the grant-free data transmission based on the at least one bit of the at least one SS indicating the deactivation of the grant-free data transmission at the at least one transceiver device, wherein the at least one transceiver device remains deactive until the activation of the grant-free transmission is indicated in the same SS;

composing, by the base station, the at least one SS for at least one transceiver device, wherein the at least one SS is configured to control the grant-free data transmission from the at least one transceiver device, wherein the at least one SS comprises one of: at least one bit of information indicating an activation of the grant-free data transmission at the at least one transceiver device, and a plurality of bits of information indicating transmission parameters, wherein at least one bit from the plurality of bits indicates an activation of the grant-free data transmission at the at least one transceiver device;

transmitting, by the base station, the at least one SS comprising one of the at least one bit of information and the plurality of bits of information of the at least one SS to the at least one transceiver, wherein one of the at least one bit of information and the plurality of bits of information of the at least one SS is transmitted as at least one of a Radio Resource Control (RRC) signalling and a Layer 1 (L1) signalling;

receiving, by the at least one transceiver device, the at least one SS from the base station using at least one of the RRC signalling and the L1 signalling, decoding, by the at least one transceiver device, the at least one SS;

activating, by the at least one transceiver device, the grant-free data transmission based on the at least one bit of the at least one SS indicating the activation of the grant-free data transmission at the at least one transceiver device, wherein the at least one transceiver device remains active until the deactivation of the grant-free transmission is indicated in the same SS; and performing, by the at least one transceiver device, the grant-free data transmission.

28. A system base station for managing a grant-free data transmission in a radio communication network, comprising:
at least one transceiver device;
a base station comprising:
a memory;
a processor; and
a Select Signal (SS) composer, operably coupled to the processor and the memory, configured to:
compose at least one SS for at least one transceiver device from a plurality of transceiver devices in the radio communication network, wherein the at least one SS comprises one of: at least one bit of information indicating a deactivation of the grant-free data transmission at the at least one transceiver device, and a plurality of bits of information indicating transmission parameters, wherein at least one bit from the plurality of bits indicates a deactivation of the grant-free data transmission at the at least one transceiver device; and transmit the at least one SS comprising to the at least one transceiver device, wherein the at least one SS is transmitted as at least one of a RRC signalling and a L1 signalling; and wherein the at least one transceiver device:
receives the at least one SS from the base station using at least one of the RRC signalling and the L1 signalling,
decodes the at least one SS; and
deactivate the at least one transceiver device based on the at least one bit of the at least one SS indicating the deactivation of the grant-free data transmission at the at least one transceiver device, wherein the at least one transceiver device remains deactive until the activation of the grant-free transmission is indicated in the same SS;

wherein said SS composer of said base station:
compose the at least one SS for the at least one transceiver device, wherein the at least one SS is configured to control the grant-free data transmission from the at least one transceiver device, wherein the at least one SS comprises one of: at least one bit of information indicating an activation of the grant-free data transmission at the at least one transceiver device for the grant-free data transmission, and a plurality of bits of information indicating transmission parameters, wherein at least one bit from the plurality of bits indicates an activation of the grant-free data transmission at the at least one transceiver device;

transmit, the at least one SS comprising one of the at least one bit of information and the plurality of bits of information of the at least one SS to the at least one transceiver device, wherein one of the at least one bit of information and the plurality of bits of information of the at least one SS is transmitted as at least one of a Radio Resource Control (RRC) signalling and a Layer 1 (L1) signalling;

wherein the at least one transceiver device:
receives the at least one SS from the base station using at least one of the RRC signalling and the L1 signalling,
decodes the at least one SS;
activates the at least one transceiver device based on the at least one bit of the at least one SS indicating the activation of the grant-free data transmission at the at least one transceiver device, wherein the at least one transceiver device remains active until deactivation of the grant-free transmission is indicated in the same SS; and
performs the grant-free data transmission.

* * * * *